United States Patent
Sen et al.

(10) Patent No.: US 10,040,714 B2
(45) Date of Patent: Aug. 7, 2018

(54) PROCESS FOR FABRICATION OF YTTERBIUM DOPED OPTICAL FIBER

(71) Applicants: Council of Scientific & Industrial Research, New Delhi (IN); Department of Electronics and Information Technology, New Delhi (IN)

(72) Inventors: Ranjan Sen, Kolkata (IN); Maitreyee Saha, Kolkata (IN)

(73) Assignees: Council of Scientific & Industrial Research, New Delhi (IN); Department of Electronics and Information Technology, New Delhi (IN)

( * ) Notice: Subject to any disclaimer, the term of this patent is extended or adjusted under 35 U.S.C. 154(b) by 0 days.

(21) Appl. No.: 14/888,930

(22) PCT Filed: Mar. 26, 2014

(86) PCT No.: PCT/IN2014/000190
§ 371 (c)(1),
(2) Date: Nov. 3, 2015

(87) PCT Pub. No.: WO2014/178063
PCT Pub. Date: Nov. 6, 2014

(65) Prior Publication Data
US 2016/0083284 A1 Mar. 24, 2016

(30) Foreign Application Priority Data
May 3, 2013 (IN) .......................... 1306/DEL/2013

(51) Int. Cl.
*C03B 37/018* (2006.01)
*C03B 37/025* (2006.01)

(52) U.S. Cl.
CPC ...... *C03B 37/01853* (2013.01); *C03B 37/018* (2013.01); *C03B 37/01807* (2013.01);
(Continued)

(58) Field of Classification Search
None
See application file for complete search history.

(56) References Cited

U.S. PATENT DOCUMENTS 4,826,288 A 5/1989 Mansfield et al.
5,474,588 A 12/1995 Tanaka et al.
(Continued)

OTHER PUBLICATIONS

Saha et al. ,"Large core Yb-doped optical fiber through vapor phase doping technique" Proc. SPIE 8775, Micro-structured and Specialty Optical Fibres II, 87750A Apr. 2013.*
(Continued)

*Primary Examiner* — Lisa L Herring
(74) *Attorney, Agent, or Firm* — DLA Piper LLP (US)

(57) ABSTRACT

The present invention provides a process for fabrication of ytterbium (Yb) doped optical fiber through vapor phase doping technique. The method comprises deposition of Al2O3 and Yb2O3 in vapor phase simultaneously in combination with silica during formation of sintered core layer. This is followed by collapsing at a high temperature in stepwise manner to produce the preform and drawing of fibers of appropriate dimension. The process parameters have been optimized in such a way that Al and Yb-chelate compounds can be transported to the reaction zone without decomposition and condensation of precursor materials. Thus variations of dopants concentration along the length of the preform have been minimized to <1% and good repeatability of the process has also been achieved. The resulting fibers also have smooth core-clad boundary devoid of any star-like defect. The process can be reliably adopted for fabrication of large core Yb doped optical fibers. The fibers (Continued)

also show low loss, negligible center dip and good optical properties suitable for their application as fiber lasers.

17 Claims, 2 Drawing Sheets

(52) U.S. Cl.
CPC ...... *C03B 37/01815* (2013.01); *C03B 37/025* (2013.01); *C03B 2201/36* (2013.01); *C03B 2203/22* (2013.01); *C03B 2207/50* (2013.01); *C03B 2207/66* (2013.01); *C03B 2207/81* (2013.01); *C03B 2207/90* (2013.01)

(56) References Cited

U.S. PATENT DOCUMENTS

| | | | |
|---|---|---|---|
| 5,961,682 | A | 5/1999 | Lee et al. |
| 6,474,106 | B1 | 11/2002 | Crossland et al. |
| 6,751,990 | B2 | 6/2004 | Bandyopadhyay et al. |
| 2002/0088252 | A1 | 7/2002 | Zhang et al. |
| 2003/0217569 | A1 | 11/2003 | Sigel, Jr. |
| 2004/0159124 | A1* | 8/2004 | Atkins .............. C03B 37/01211 65/391 |
| 2005/0276555 | A1* | 12/2005 | Haruna ............. C03B 37/01807 385/123 |
| 2007/0137257 | A1* | 6/2007 | DeSantolo ........... C03B 19/1438 65/417 |
| 2012/0060561 | A1* | 3/2012 | Kitamura .......... C03B 37/01807 65/399 |
| 2012/0201504 | A1* | 8/2012 | Sen ................. C03B 37/01838 385/141 |

OTHER PUBLICATIONS

Saha et al., "Large Core Yb-Doped Optical Fiber through Vapor Phase Doping Technique", CSIR, SPIE Optics and Optoelectronics Conference, Apr. 15, 2013, presentations slides 1-18.*
Saha et al., "Large Core Yb-Doped Optical Fiber through Vapor Phase Doping Technique", CSIR, SPIE Optics and Optoelectronics Conference, Apr. 15, 2013, 1 page handout.*
Nagel et al., "An Overview of the Modified Chemical Vapor (MCVD) Process and Performance", IEEE Transactions on Microwave Theory and Techniques, vol. MTT-30 No. 4, Apr. 1982.*
Lenardic and Kveder, "Advanced Vapor-Phase Doping Method Using Chelate Precursor for Fabrication of Rare Earth-Doped Fibers," *Optical Fiber Communication* (2009), 1-3.
Sekiya et al., "Fabrication of Yb-Doped Silica Glass through the Modification of MCVD Process," *J. Non-Crystalline Solids* (2008), 354:4737-4742, Elsevier.
Tumminelli et al., "Fabrication of High-Concentration Rare-Earth Doped Optical Fibers Using Chelates," *J. Lightwave Technology* (1990), 8(11):1680-1683.
Boyland, Alexander J. et al.: "*Rare-Earth Doped Optical Fiber Fabrication Using Novel Gas Phase Deposition Technique*"; Optoelectronics Research Centre, University of Southampton, Southampton, SO17 1BJ, United Kingdom, 2010, 3 pages.
Jackson, Stuart D. et al.: "*High power $Tm^{3+}$-doped silica fibre laser fabricated using chelate delivery deposition*"; Optics Communications 216 (2003) 401-404.

* cited by examiner

PROCESS FOR FABRICATION OF YTTERBIUM DOPED OPTICAL FIBER

CROSS-REFERENCE TO RELATED APPLICATIONS

This application is a 35 USC § 371 National Stage application of International Application No. PCT/IN2014/000190 filed Mar. 26, 2014, now pending; which claims the benefit under 35 USC § 119(a) to India Application No. 1306/DEL/2013 filed May 3, 2013. The disclosure of each of the prior applications is considered part of and is incorporated by reference in the disclosure of this application.

FIELD OF THE INVENTION

The present invention relates to a process for fabrication of ytterbium (Yb) doped optical fiber through vapor phase doping technique. More particularly, the invention relates to fabrication of Yb/Al doped optical fiber by vapor phase deposition technique.

BACKGROUND OF THE INVENTION

Rare earth (RE) doped optical fibers has found promising applications in the field of optical amplifiers, fiber lasers and sensors. The RE elements doped into the core of such fibers act as the active medium. Different REs like Er, Nd, Yb, Sm, Ho and Tm can be doped to get lasing and amplification covering a wide range of wavelengths. RE doped fiber lasers are replacing gas based or solid state lasers in most of the applications due to their compactness, excellent beam quality and easy handling capability. As a result, there has been around 16% market growth of fiber laser with the overall sales touched $1.35 billion for the year 2012 as reported by Industrial Laser Solutions. Fiber laser devices are suitable for a variety of applications viz. material processing (cutting, grinding and engraving), range finding, medical and military applications. Thus fabrication of RE doped fibers with varied designs, compositions and appropriate RE concentration attracts a lot of research interest. The improvement in the properties of the fibers and increase in the process reproducibility remain the prime objective.

Reference may be made to U.S. Pat. No. 4,826,288 (1989) by R. J. Mansfield, B. C. McCollum, R. P. Tumminelli, "Method for fabricating optical fibers having cores with high rare earth content" wherein, the Modified chemical vapor deposition (MCVD) process with vapor phase chelate delivery technique is adopted for incorporation of high RE ions at the core of the fiber. The core layer deposition was done with silica along with refractive index raising dopant like $Al_2O_3$ and RE oxides like $Nd_2O_3$ or $Yb_2O_3$ and $Er_2O_3$. $Al_2Cl_6$ and $RE(thd)_3$ served as Al and RE incorporating agent respectively. Helium used as carrier gas of Al and RE compounds. The sources of RE vapor made of glass columns which were filled with solid RE-chelates along with an inert compound such as granulated high purity $SiO_2$ or $Al_2O_3$. The columns were heated upto a maximum temperature of 200° C. The temperature of transport line for $Nd(thd)_3$ was in the range of 210° C.-225° C. Various gaseous components were delivered to the reaction zone approximately 250° C., at most. The preferred concentrations of materials in the glass core were: 2-20 wt % of $Al_2O_3$, 0.1-4 wt % of $Nd_2O_3$ and remainder being $SiO_2$ glass. Another fiber also made with combination of $Yb^{3+}$ and $Er^{3+}$ ions. Total $RE_2O_3$ concentration was in excess of 5 wt %.

Drawbacks:—They believe to have RE content in the core of preform of about 0.1 to 10 Wt % or more. But in claim part, they only claim about 0.5 wt % of $RE_2O_3$. Nothing is said about the length of the preform and distribution of the dopants in the longitudinal as well as the radial direction.

Reference may be made to U.S. Pat. No. 5,961,682 (1999) by Yong-woo Lee, A. N. Guryanov, V. F. Khopin, D. D. Gusovsky, "Method of fabricating optical fiber doped with rare earth element using volatile complex" wherein, reaction of volatile RE-chelate compounds with $SiCl_4$ and $O_2$ took place. The surface of the tube was heated and water cooled to deposit porous core layer on which $Al_2Cl_6$ or $SiF_4$ vapors absorbed. Volatile organic metal ligand composed of tris-cyclopentadienyl or tris-isopropylcyclopentadienyl compound of metal ions Er, Dy or Yb used for RE incorporation. Organic ligand bubbler temperature varied in the range of 150-300° C. while $Al_2Cl_6$ bubbler temperature was in the range of 140-150° C. Freon gas was used to reduce OH content in the fiber. The difference in the refractive index between cladding layer and core layer greater than 0.025 achieved.

Reference may be made to U.S. Pat. No. 6,474,106 B1 (2002), by C. E. Crossland, Gang Qi, "Rare earth and Alumina-doped optical fiber preform process" wherein, an OVD process has employed to deposit porous soot core layer of $SiO_2$—$GeO_2$—$Al_2O_3$—$Er_2O_3$ and then cladding layer employed on it as soot-on-soot process and then consolidation of the soot was done following soot-on-glass process in which the mandrel moved leaving a hollow, cylindrical soot blank core. The soot blank core was then consolidated and sintered in certain steps, to form a core rod known as cane. The temperature of solid $AlCl_3$ containing sublimator was varied preferably in between 150° C.-170° C. with Helium/Argon flow rates of about 0.5 to 0.7 slm to incorporate various concentration of $Al_2O_3$ in the final preform. Er containing precursors, such as $Er(FOD)_3$ or $Er(C_{30}H_{30}F_{21}O_6)_3$, were heated in a bubbler to a temperature range of 130° C.-200° C. Higher Al containing preforms were reported as inclusions free. $Er_2O_3$ concentration was around 500 ppm in each preform but concentrations of $GeO_2$ and $Al_2O_3$ were varied in between 10 to 20 wt % and 2 to 10 wt % respectively.

Reference may be made to US Patent No. US 2005/0276555 A1 (2005) by T. Haruna, S. Ishikawa, T. Tam, T. Katayama, N. Taira, "Glass-body-producing method and optical glass body and optical fiber" wherein, an organometallic compound is heated from the outside into a glass pipe so that it decomposed into an organic constituent and metallic constituents upstream of the reaction zone. The organic part condensed and deposited there and the metallic part oxidized and deposited with glass layer. The decomposition performed by thermal-decomposition or photo-decomposition by using heat source or light source at temperature 100° C.-1000° C. During consolidation step $Cl_2$ gas was used for dehydration purpose to reduce the OH content. The OH content in the glass body had been reduced to 10 ppm, even at most 1 ppm.

Reference may be made to R. P. Tumminelli, B. C. McCollum, E. Snitzer, Journal of light wave Technology, Vol. 8, No. 11, (1990) pp. 1680-1683, "Fabrication of high concentration rare earth doped optical fibers using chelates" wherein, an individual $AlCl_3$ delivery line and three separate sources of RE-chelates were used. The RE-chelate columns were heated individually to the temperature in between 150 to 210° C. Carrier gas Helium was preheated and passed through RE and Al columns and delivered to a rotating mechanical seal via a heated delivery system. RE, Al and other reactants kept separated to prevent prereaction in the heated delivery tube. A ribbon burner was provided throughout the entire length prior to the reaction zone. The fiber containing 11 wt % $Yb_2O_3$ and 0.2 wt % $Er_2O_3$ had been prepared. Another fiber containing 1.0 wt % of $Nd_2O_3$ had base losses <10 dB/kin at 1130 nm. For high concentration fiber base loss was around 150 dB/km at 1064 nm at 80° C. with OH concentration in between 15 to 20 ppm.

Drawbacks:—Nothing is said about the length of the preform and the distribution of the dopants in the longitudinal as well as the radial direction. For high concentration fibers, background loss and OH concentration is much higher.

Reference may be made to S. D. Jackson, T. Ryan, S. Mossman, Optics Communications, Vol. 216, (2003) pp. 401-404, "High power $Tm^{+3}$-doped silica fibre laser fabricated using chelate delivery deposition" wherein, a single dopant chamber contained a mixture of $Tm^{3+}$ and $Al^{3+}$ chelate which was heated to 200° C. and the vapor is entrained in the flow of $O_2$, helium and other precursor materials. Then oxidation and deposition as porous layer took place which dried using $Cl_2$ gas. The layer then sintered and collapsed in usual manner. The double-clad fiber had a ~12 μm core diameter with NA of 0.19. $Tm^{3+}$ concentration was of ~0.35 wt % and background loss of <10 dB/km at 1300 nm.

Drawbacks:—Concentration level is significantly lower than that already achieved by solution doping method. The chelate heating system was not optimized and the process was limited to be batch type, using only 0.3 gm of chemical. They expect lower background losses but value is not mentioned.

Reference may be made to US 2002/0088252, wherein, a method and apparatus for the manufacture of an optical fiber preform having incorporated therein a rare earth halogen is disclosed.

Drawbacks:—Due to the incorporation of RE-chloride, boat temperature and multi-concentric delivery line temperature has to be maintained >900° C. Moreover, when RE-chloride passes through the innermost part of the concentric tube it encounters higher temperature which may result in decomposition of precursor material.

Reference may be made to E. H. Sekiya, P. Barua, K. Saito, A. J. Ikushima, Journal of Non-Crystalline solids, Vol. 354, (2008) pp. 4737-4742, "Fabrication of Yb-doped silica glass through the modification of MCVD process" wherein, $Yb(DPM)_3$ furnace temperature was varied in the range of 200-250° C., but $AlCl_3$ furnace temperature was kept fixed at 130° C. Temperature of the delivery lines including that of $SiCl_4$ and other gaseous components were kept higher than the temperature of the Yb furnace to avoid condensation of precursor material in the nozzle part. Deposition conditions such as deposition temperature, $SiCl_4$ flow and burner speed was fixed to 1950° C., 0.6 g/min and 145 min/min respectively. $Yb^{3+}$ concentration obtained for only Yb-doped runs was in the range of 0.15-1.2 wt % while $Yb^{3+}$ concentration for Yb and Al doped runs was maximum of 0.7 wt % with $Al^{3+}$ concentration around 0.4 wt %. The variation in refractive index was of ±5% in the longitudinal direction and ±10% in the radial direction.

Drawbacks:—Soot layer deposition took place over a length of 550 mm of silica tube. But uniform core diameter and dopant distribution obtained in a preform of length of only 300 mm. $Yb^{3+}$ concentration is much lower compared to conventional method. $SiCl_4$ and other gases delivered from normal MCVD gas cabinet also have to send at higher temperature than Yb furnace, otherwise dopants will get condensed in the concentric nozzle part. Variation in dopant distribution in radial direction is around ±10%.

Reference may be made to US 2003/0217569, wherein, a preform for a low fiber optic cable and method and apparatus for fabricating the preform is disclosed. The method includes providing $AlCl_3$ and CVD precursors locally doping $CaCl_3$.

Drawbacks:—Discloses a completely different glass system. The emphasis is on addition of CaO for lowering sintering temperature. Further, RE vapor delivery process is through multi concentric tubes.

Reference may be made to B. Lenardic, M. Kveder, Optical society of America, OSA/OFC/NFOEC 2009, "Advanced vapor-phase doping method using chelate precursor for fabrication of rare earth-doped fibers" wherein, the precursor vapors volatized at temperatures between 100° C.-220° C. and transported to the reaction zone by a system of heated conduits, specially constructed high-temperature rotary seal and sliding precursor vapor injection tube. Instead of burner MCVD is equipped with an induction furnace. Two different designs of sublimator used, bulk sublimator and flat bed sublimator. Flow rate of $O_2$ through $SiCl_4$ bubbler was set to 100 to 250 sccm at bubbler temperature of 35° C. with carriage traversed speed of 100 mm/min. Collapsing was comparatively faster as higher amount of heat supplied by induction furnace. Relationship evaluated between evaporation rate of Yb-chelate and final $Yb_2O_3$ concentration in the fiber and evaporation rate of $AlCl_3$ with $AlCl_3$ sublimator temperature. One preform with $Er^{3+}$ concentration of 2680 ppm and $Al^{3+}$ concentration of 4900 ppm and another preform with $Yb^{3+}$ concentration of 31300 ppm and $Al^{3+}$ concentration of 12000 ppm have been fabricated.

Drawbacks:—Soot layer deposition took place over a length of 600 mm of silica tube. But final preform of length obtained of about 250-350 mm. Larger diameter of substrate tube (30/27 or 25/22) was compulsory to permit sliding injection tube into the substrate tube. Only 20 core layer can be deposited. From the refractive index profiles of the preforms, it is clear that the preforms having high center dip and variation in dopant concentration in radial direction.

Reference may be made to J. Sahu et. al., Optical society of America, OSA/CLEO/QELS 2010, "Rare-earth doped optical fiber fabrication using novel gas phase deposition technique" wherein, the chelate compound was heated in a crucible directly within the MCVD structure which is placed in a non-rotating tube close to the deposition zone. The crucible can be heated upto 800° C. and allowing inert gas to flow down the non-rotating tube and carry the generated vapors to the reaction zone while $SiCl_4$ and other dopants are added to the rotating part of the outer tube. High level of Al incorporated to give NA of 0.24 with base loss ~3 dB/km. $Yb^{3+}$ concentration of 9000-20000 ppm-wt was achieved by adjusting crucible temperature with the base loss in the range of 30-70 dB/km. Core diameter of the fabricated fiber was 20 μm (overall fiber diameter 125 μm).

Drawbacks:—As Helium passes through the crucible, it will carry the vapors generated at the upper surface of the crucible. So evaporation rate of RE-chelate compound will be dependent of exposed surface area. It will be problematic to incorporate two or more RE compounds simultaneously.

Reference may be made to U.S. Pat. No. 5,474,588 (1995) by D. Tanaka, A. Wada, T. Sakai, T. Nozawa and R. Yamauchi, "Solution doping of a silica with erbium, aluminium and phosphorus to form an optical fiber" wherein a manufacturing method for Er doped silica is described in which silica glass soot is deposited using VAD apparatus to form a porous soot preform, dipping the said preform into an ethanol solution containing an erbium compound, an Al compound and a phosphoric ester, and desiccating said preform to form Er, Al and P containing soot preform. The desiccation is carried out for a period of 24-240 hours at a temperature of 60 to 70° C. in an atmosphere of nitrogen gas or inert gas. This desiccated soot preform is heated and dehydrated for a period of 2.5-3.5 hours at a temperature of 950 to 1050° C. in an atmosphere of helium gas containing 0.25 to 0.35% chlorine gas and further heated for a period of 3-5 hours at a temperature of 1400 to 1600° C. to render it transparent, thereby forming an erbium doped glass preform. The segregation of $AlCl_3$ in the preform formation process is suppressed due to the presence of phosphorus and as a result the doping concentration of $Al^{3+}$ can be set to a high level (>3 wt %). It has been also claimed that the dopants concentration and component ratio of Er, Al and P ions having extremely accurate and homogeneous in the radial as well as in longitudinal directions.

Reference may be made to U.S. Pat. No. 6,751,990 (2004), by T. Bandyopadhyay, R. Sen, S. K. Bhadra, K. Dasgupta and M. Ch. Paul, "Process for making rare earth doped optical fiber" wherein, unsintered particulate layer containing $GeO_2$ and $P_2O_5$ core layer is deposited and doping by soaking the porous soot layer into an alcoholic/ aqueous solution of RE-salts containing co-dopants like $AlCl_3/Al(NO_3)_3$ in definite proportion is carried out. The porosity of the soot, dipping period, strength of the solution and the proportion of the codopants are controlled to achieve the desired $RE^{3+}$ concentration in the core and to minimize the core clad boundary defects. In subsequent steps drying, oxidation, dehydration and sintering of the RE containing porous deposit are performed followed by collapsing at a high temperature to produce the preform. The $RE^{3+}$ distribution in the resulting fiber matches with the Gaussian distribution of the pump beam to increase the overlapping and pump conversion efficiency.

The drawbacks of the above mentioned processes are as follows:
1. Low concentration of dopant material as compared to conventional process;
2. Decomposition and condensation of RE precursor materials occurred prior to reaction zone;
3. Variation of dopant concentration along the longitudinal and radial direction of the preform;
4. Shorter preform length due to loss in effective deposition zone;
5. Process parameters are not optimized.

OBJECTS OF THE INVENTION

The main object of the present invention is to provide a process of fabrication of Yb doped optical fiber through vapor phase doping technique which obviates the drawbacks of the hitherto known prior art as detailed above.

Still another object of the present invention is to fabricate large core $Yb_2O_3$ doped preform/fiber difficult to fabricate employing conventional solution doping process.

Another object of the present invention is to dope $Yb_2O_3$ and $Al_2O_3$ simultaneously with silica during formation of core layer for good homogeneity.

Yet another object of the present invention is to fabricate preform/fiber comprising of high concentration $Yb_2O_3$ and $Al_2O_3$.

Another object is to increase effective preform length suitable for drawing long length of fiber.

Still another object of the present invention is to provide a method where the $Yb_2O_3$ concentration uniformity along the longitudinal and radial direction of the preform/fiber core is superior to the hitherto known methods.

Yet another object of the present invention is to provide a method where the core-clad interface problem associated with high $Al_2O_3$ doping level is eliminated.

Still another object of the present invention is to provide a reliable process of making large core Yb doped preform/ fiber.

BRIEF DESCRIPTION OF ACCOMPANYING DRAWINGS

SUMMARY OF THE INVENTION

Figure 1:
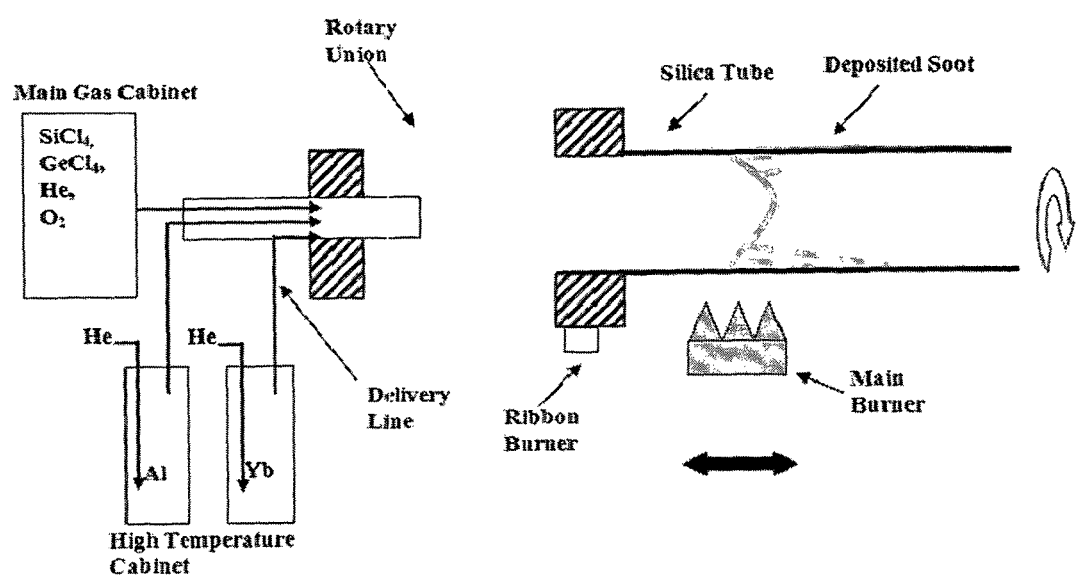
FIG. 1 represents OFC-12 MCVD system with high temperature vapor delivery unit.
Figure 2:
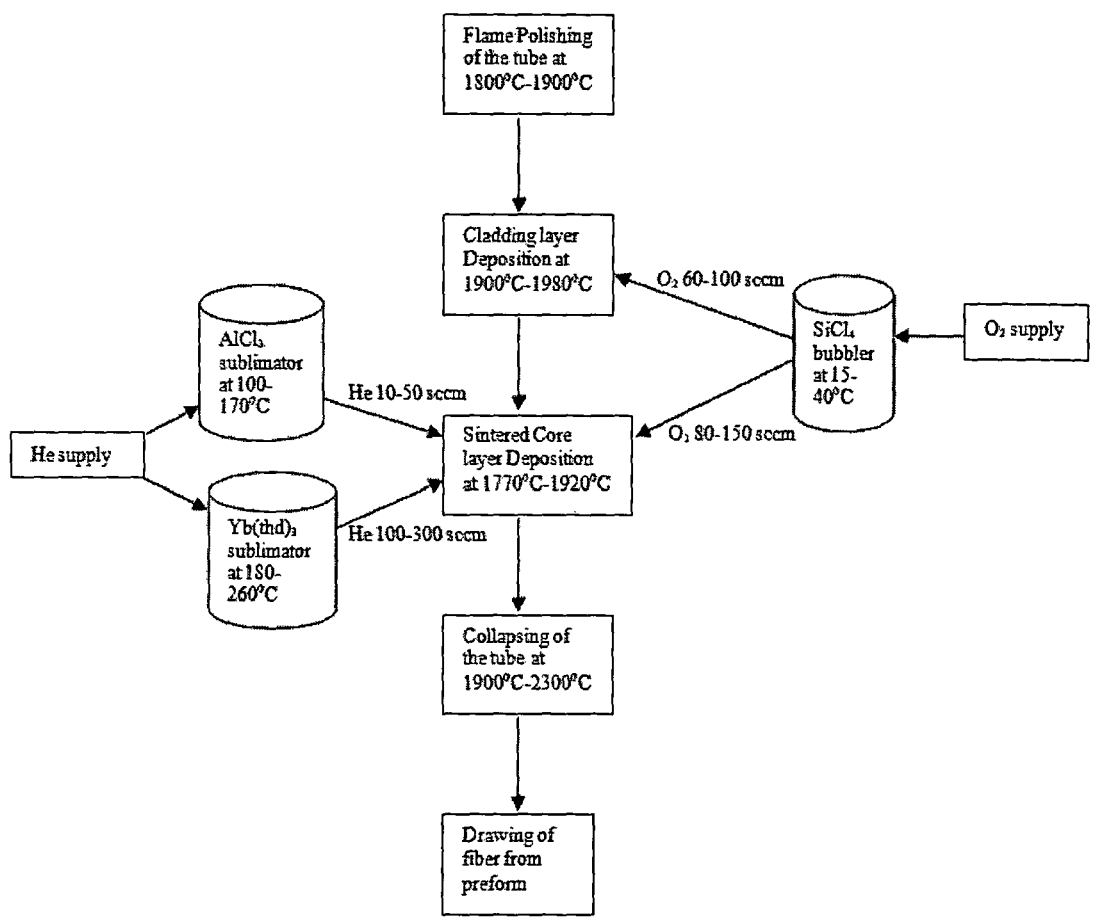
FIG. 2 represents flowchart for fabrication of Yb doped optical fiber by the present invention.

Accordingly, present invention provides a process for fabrication of ytterbium (Yb) doped optical fiber through vapor phase doping technique, said process comprising the steps of:
(i) depositing pure silica cladding layers inside a silica glass substrate tube at a temperature in the range of 1900 to 1980° C. using Modified chemical vapor deposition (MCVD) process;
(ii) sublimating Aluminum (Al) salt and Yb-chelate in their respective sublimator chamber at a temperature in the range of 100 to 170° C. and 180 to 260° C. respectively to obtain Al-precursors and Yb-precursors;
(iii) introducing preheated inert carrier gas in the sublimator chamber of step (ii) at a flow rate in the range of 10 to 50 sccm for Al precursors and 100 to 300 sccm for Yb precursors;
(iv) transporting Al and Yb precursors with inert gas obtained in step (iii) to the substrate tube with the adjustment of temperature of ribbon burner in the range of 180-370° C.;
(v) passing $O_2$ gas into a $SiCl_4$ bubbler at a temperature in the range of 15 to 40° C. and a flow rate in the range of 80 to 150 sccm to transport $SiCl_4$—$O_2$ gas mixture to the substrate tube;
(vi) mixing $SiCl_4$, $O_2$, Al precursors, Yb-precursors, and inert gas in the substrate tube followed by concurrent oxidation to form $SiO_2$, $Al_2O_3$ and $Yb_2O_3$;
(vii) depositing a sintered core layer comprising $SiO_2$—$Al_2O_3$—$Yb_2O_3$ with targeted $Al_2O_3$ and $Yb_2O_3$ concentrations to obtain a deposited tube;
(viii) collapsing the deposited tube at a temperature in the range of 1900 to 2300° C. to obtain fabricated preform; and
(ix) drawing fibers from the fabricated preform obtained in step (viii) to obtain ytterbium (Yb) doped optical fiber.

In an embodiment of the present invention, 4-10 pure silica cladding layers are deposited in the substrate tube.

In yet another embodiment of the present invention, the temperature is in the range of 1910-1960° C.

In another embodiment of the present invention, the Al salt is $AlCl_3$.

In yet another embodiment of the present invention, the sublimating temperature for Al salt is in the range of 120 to 160° C.

In yet another embodiment of the present invention, the Yb-chelate is Yb(thd)$_3$.

In yet another embodiment of the present invention, the sublimating temperature for Yb-chelate is in the range of 200 to 240° C.

In yet another embodiment of the present invention, the inert carrier gas is helium.

In yet another embodiment of the present invention, the temperature of ribbon burner is in the range of 200-350° C.

In yet another embodiment of the present invention, the number of core layers is in the range of 1 to 40.

In yet another embodiment of the present invention, the temperature of deposition of sintered core layer is in the range of 1770 to 1920° C.

In still another embodiment of the present invention, the temperature of deposition of sintered core layer is in the range of 1820-1880° C.

In yet another embodiment of the present invention, the sintered core layer is deposited with a burner traverse speed in the range of 9 to 14 cm/min.

In yet another embodiment of the present invention, the NA (Numerical aperture) of the core glass is in the range of 0.06 to 0.32.

In yet another embodiment of the present invention, the Al$_2$O$_3$ content of the fiber is in the range of about 0.5 to 18 mol %.

In yet another embodiment of the present invention, the Yb$_2$O$_3$ concentration of the fiber is in the range of 0.2 to 2.0 mol %.

In still another embodiment of the present invention, Yb$_2$O$_3$ concentration of the fiber is in the range of 0.25 to 1.25 mol %.

In yet another embodiment of the present invention, the collapsing temperature is in the range of 2050-2250° C.

In yet another embodiment of the present invention, the length of the fabricated preforms is up to 45 cm.

In yet another embodiment of the present invention, the core diameter of the fabricated fiber is in the range of 10 to 50 μm out of 125 μm overall diameter.

In still another embodiment of the present invention, the fabricated fiber exhibits uniform Yb distribution along the longitudinal as well as the radial direction of the preform/fiber with minimal core-clad interface problem.

In yet another embodiment of the present invention, variation of Al concentration at the two ends of the fabricated fiber is negligible.

In yet another embodiment of the present invention, variation in Yb concentration at the two ends of the fabricated fiber is less than <1%.

DETAILED DESCRIPTION OF THE INVENTION

The invention disclosed in the present specification provides a process for fabrication of Yb doped optical fiber through vapor phase doping technique which comprises:
(i) deposition of pure silica cladding layers inside a silica glass substrate tube to obtain matched clad type structure;
(ii) evaporating anhydrous Al-salt and Yb-chelate by heating them in their respective sublimator chamber;
(iii) introducing heated inert gas to transport vapors of Al-salt and Yb-compound to the substrate silica tube;
(iv) passing O$_2$ gas into SiCl$_4$ bubbler to transport SiCl$_4$—O$_2$ gas mixture to the substrate tube;
(v) mixing of different transported gases viz. SiCl$_4$—O$_2$—AlCl$_3$—Yb-chelate and inert gas into the substrate tube;
(vi) concurrent oxidation of introduced vapors to form corresponding oxides viz. SiO$_2$, Al$_2$O$_3$ and Yb$_2$O$_3$;
(vii) deposition of sintered core layer comprising SiO$_2$—Al$_2$O$_3$—Yb$_2$O$_3$ with targeted Al$_2$O$_3$ and Yb$_2$O$_3$ concentrations at an appropriate temperature;
(viii) collapsing of the tube in steps to obtain preform; and
(ix) drawing of fibers from the preform.

The novelty of the present invention lies in fabrication of large core preform/fiber containing Yb$^{3+}$ and Al$^{3+}$ ions with superior longitudinal and radial uniformity and reduced core-clad interface problem due to which the fiber exhibits improved optical properties and better lasing performance.

In case of vapor phase doping technique, decomposition and condensation of Al and Yb-chelate compounds prior to the reaction zone resulting in variation of dopant concentration along the length of the preform are the two major problems. As a result, the process has not yet been adopted for commercial production.

In the present invention, the process parameters of the vapor phase doping technique have been optimized in such a way that Al and Yb-chelate compounds can be transported to the reaction zone without decomposition and condensation of precursor materials. Thus variation of dopants concentrations along the length and radial direction of the preform, have been minimized and deposition of more than forty core layers without any problem have also been achieved with good repeatability. As deposition of Al$_2$O$_3$ and Yb$_2$O$_3$ takes place simultaneously in presence of silica during formation of core layer in vapor phase, core-clad interface problem has also been eliminated due to better distribution of dopants into silica network.

The inventive step lies in:
1. Delivery of Al and Yb-chelate compounds in vapor phase without decomposition and/or condensation of the precursor materials prior to the reaction zone.
2. Formation and deposition of Al$_2$O$_3$ and Yb$_2$O$_3$ simultaneously in presence of silica and/or other refractive index modifying dopants during core layer deposition, so that the dopants are easily incorporated into silica network.
3. Main burner temperature has been optimized in such a way that complete sintering of the deposited layers takes place with negligible decomposition of the precursor materials, leading to enhanced process repeatability.

The present invention is illustrated in FIG. 1 of the drawing accompanying this specification. In the drawing, there is one Main Gas cabinet and one High Temperature cabinet. Main gas cabinet is used to deliver normal MCVD gases (SiCl$_4$, GeCl$_4$, He, O$_2$) while high temperature cabinet is used to supply solid Yb and Al precursor materials in vapor phase. There are three separate delivery lines; one is for normal MCVD gases delivered from main gas cabinet and other two are from high temperature cabinet to transport Al and Yb precursor materials separately. The delivery lines from high temperature cabinet as well as all the lines that pass through the rotary union are kept heated and then the mixture of gases and vapors enters the silica tube. There is one ribbon burner at the input end of the silica tube which provides sufficient temperature for the flow of Yb precursor materials without condensation; but the temperature is not so high that it could be decomposed.

The process starts with flame polishing of the pure silica tube (Type: Heraeus F-300, Size: 24/28 mm or 17/20 mm)

at around 1800-1900° C. to remove defects on the inner surface of the tube. Then deposition of pure $SiO_2$ sintered layers takes place to form matched clad type geometry at a temperature range of 1900-1980° C. using normal MCVD technique. The dopant precursor materials of Al and Yb which are in solid form, sublimated and transformed into their respective vapor phase by heating within the sublimators at the temperature range of 100-170° C. and 180-260° C. respectively. Controlled amount of preheated inert gas, such as Helium is added to the respective sublimator at the flow rates of 10-50 sccm for Al and 100-300 sccm for Yb respectively. Vapors of Al and Yb precursor materials are transported to the reaction zone by a system of highly heated delivery lines with temperature above 200° C., one high-temperature rotary union (temperature >200° C.) and one ribbon burner at the input end of the silica tube. The temperature of the ribbon burner is adjusted in such a way that the decomposition and/or condensation of the dopant precursor materials do not take place at the upstream end of the main burner. Controlled amount of $O_2$ is added to the $SiCl_4$ bubbler (maintained at a temperature varying in between 15-40° C.) at the flow rates of 80-150 sccm to supply $SiCl_4$—$O_2$ gas mixture to the reaction zone. The deposition of $Al_2O_3$ and $Yb_2O_3$ takes place simultaneously in presence of silica through vapor phase doping technique. The main burner temperature is adjusted to ensure complete sintering of the core layers with minimal decomposition of the RE compounds prior to the reaction zone. The sintered core layer deposition takes place at a temperature range of 1770-1920° C. with carriage traverse speed of 9-14 cm/min. About 1 to 40 core layers are deposited simultaneously to form large core preform. After completion of the deposition, the tube is collapsed in stepwise manner at a temperature between 1900-2300° C. to obtain the final preform. Fiber is drawn from the two ends of the preforms with diameter of 125±0.2 μm using a Fiber Drawing Tower. The fibers are characterized in order to determine their geometrical properties, numerical aperture (NA), Yb concentration and to estimate the variation in dopant concentrations over the length of the preforms. Yb concentration is estimated from the absorption peak at 915 nm determined by 'cut-back' method. The dopant concentrations were also evaluated by Electron Probe Micro Analysis (EPMA) to check the dopant uniformity.

The different steps of the process are as follows:
(i) deposition of pure silica cladding layers inside a silica glass substrate tube to obtain matched clad type structure;
(ii) evaporating anhydrous Al-salt and Yb-chelate by heating them in their respective sublimator chamber;
(iii) introducing heated inert gas to transport vapors of Al-salt and Yb-compound to the substrate silica tube;
(iv) passing $O_2$ gas into $SiCl_4$ bubbler to transport $SiCl_4$—$O_2$ gas mixture to the substrate tube;
(v) mixing of different transported gases viz. $SiCl_4$—$O_2$—$AlCl_3$—Yb-chelate and inert gas into the substrate tube;
(vi) concurrent oxidation of introduced vapors to form corresponding oxides viz. $SiO_2$, $Al_2O_3$ and $Yb_2O_3$;
(vii) deposition of sintered core layer comprising $SiO_2$—$Al_2O_3$—$Yb_2O_3$ with targeted $Al_2O_3$ and $Yb_2O_3$ concentrations at an appropriate temperature;
(viii) collapsing of the tube in steps to obtain preform; and
(ix) drawing of fibers from the preform.

The inventive step lies in incorporation of $Yb_2O_3$ and $Al_2O_3$ simultaneously in combination with $SiO_2$ during formation of core layer so that the dopants are easily incorporated into silica network. The process provides good homogeneity with reduced chances of forming RE cluster. Compared to the known techniques, the present method also enables to fabricate larger core preforms with better longitudinal and radial RE uniformity and smooth core-clad boundary with no star like defects. There is also no central dip in the refractive index profile of the fiber. The resulting preform/fiber contains about 0.5 mol % to 18 mol % of $Al_2O_3$ and about 0.1 mol % to 2.0 mol % of $Yb_2O_3$.

Thus, the present invention is directed to make large core Yb doped preforms with pre-determined NA to achieve the designed single mode or multimode configurations.

EXAMPLES

The following examples are given by way of illustration and therefore should not be construed to limit the scope of the present invention.

Example 1

Deposition of sintered silica cladding layer was carried out inside a high quality silica tube at a temperature of 1940° C. using MCVD process.

Deposition of sintered core layer (MCVD process) comprising $SiO_2$—$Al_2O_3$—$Yb_2O_3$ was carried out by maintaining the following parameters:
$SiCl_4$ bubbler temperature: 25° C.
Oxygen flow rate through $SiCl_4$ bubbler: 120 sccm
$AlCl_3$ sublimator temperature: 140° C.
Helium flow rate through $AlCl_3$ sublimator: 20 sccm
$Yb(thd)_3$ sublimator temperature: 220° C.
Helium flow rate through $Yb(thd)_3$ sublimator: 200 sccm
Deposition temperature: 1845° C.
Carriage traverses speed: 12.5 cm/min
Ribbon burner temperature: 280° C.

The collapsing was carried out in stepwise manner (4 forward collapsing steps at a temperature of 2060, 2130, 2175 and 2210° C. and a back collapsing at 2260° C.) to obtain the final preform.

The fiber was drawn from fabricated preform (length 400 mm) having the following specifications:
Core diameter: 12.0 μm out of 125 μm overall diameter
NA: 0.12
$Yb_2O_3$ concentration: 0.32 mol %
$Al_2O_3$ concentration: 2.6 mol %
Variation in Yb concentration at the two ends of the preform: 0.8%

Example 2

Deposition of sintered silica cladding layer was carried out inside a high quality silica tube at a temperature of 1930° C. using MCVD process.

Deposition of sintered core layer (MCVD process) comprising $SiO_2$—$Al_2O_3$—$Yb_2O_3$ was carried out by maintaining the following parameters:
$SiCl_4$ bubbler temperature: 30° C.
Oxygen flow rate through $SiCl_4$ bubbler: 90 sccm
$AlCl_3$ sublimator temperature: 160° C.
Helium flow rate through $AlCl_3$ sublimator: 25 sccm
$Yb(thd)_3$ sublimator temperature: 230° C.
Helium flow rate through $Yb(thd)_3$ sublimator: 140 sccm
Deposition temperature: 1830° C.
Carriage traverses speed: 12.0 cm/min
Ribbon burner temperature: 295° C.

The collapsing was carried out in stepwise manner (5 forward collapsing steps at a temperature of 2045, 2090, 2125, 2160 and 2190° C. and a back collapsing at 2230° C.) to obtain the final preform.

The fiber was drawn from fabricated preform (length 350 mm) having the following specifications:
  Core diameter: 20.0 µm out of 125 µm overall diameter
  NA: 0.20
  $Yb_2O_3$ concentration: 0.22 mol %
  $Al_2O_3$ concentration: 7.7 mol %

Example 3

Deposition of sintered silica cladding layer was carried out inside a high quality silica tube at a temperature of 1945° C. using MCVD process.

Deposition of sintered core layer (MCVD process) comprising $SiO_2$—$Al_2O_3$—$Yb_2O_3$ was carried out by maintaining the following parameters:
  $SiCl_4$ bubbler temperature: 20° C.
  Oxygen flow rate through $SiCl_4$ bubbler: 80 sccm
  $AlCl_3$ sublimator temperature: 130° C.
  Helium flow rate through $AlCl_3$ sublimator: 38 sccm
  $Yb(thd)_3$ sublimator temperature: 240° C.
  Helium flow rate through $Yb(thd)_3$ sublimator: 270 sccm
  Deposition temperature: 1860° C.
  Carriage traverses speed: 11.5 cm/min
  Ribbon burner temperature: 210° C.

The collapsing was carried out in stepwise manner (3 forward collapsing steps at a temperature of 2110, 2170 and 2210° C. and a back collapsing at 2255° C.) to obtain the final preform.

The fiber was drawn from fabricated preform (length 370 mm) having the following specifications:
  Core diameter: 9.5 µm out of 125 µm overall diameter
  NA: 0.14
  $Yb_2O_3$ concentration: 0.85 mol %
  $Al_2O_3$ concentration: 3.8 mol %

Example 4

Deposition of sintered silica cladding layer was carried out inside a high quality silica tube at a temperature of 1950° C. using MCVD process.

Deposition of sintered core layer (MCVD process) comprising $SiO_2$—$Al_2O_3$—$Yb_2O_3$ was carried out by maintaining the following parameters:
  $SiCl_4$ bubbler temperature: 25° C.
  Oxygen flow rate through $SiCl_4$ bubbler: 130 sccm
  $AlCl_3$ sublimator temperature: 148° C.
  Helium flow rate through $AlCl_3$ sublimator: 12 sccm
  $Yb(thd)_3$ sublimator temperature: 200° C.
  Helium flow rate through $Yb(thd)_3$ sublimator: 160 sccm
  Deposition temperature: 1890° C.
  Carriage traverses speed: 10.5 cm/min
  Ribbon burner temperature: 330° C.

The collapsing was carried out in stepwise manner (5 forward collapsing steps at a temperature of 1980, 2040, 2090, 2150 and 2210° C. and a back collapsing at 2260° C.) to obtain the final preform.

The fiber was drawn from fabricated preform (length 420 mm) having the following specifications:
  Core diameter: 40.0 µm out of 125 µm overall diameter
  NA: 0.11
  $Yb_2O_3$ concentration: 0.08 mol %
  $Al_2O_3$ concentration: 2.3 mol %

Variation in Yb concentration at the two ends of the preform: 1.7%

Advantages of the Invention

The main advantages of the present invention are:
1. In-situ RE incorporation, free from any mechanical alteration problem during the preform fabrication run.
2. Higher amount of dopants incorporation efficiency as compare to prior art.
3. RE clustering problem is much lower as compared to other conventional preparation methods.
4. The process provides smooth core-clad boundary, without generation of star-like defects which appear for high concentration of $Al_2O_3$ doping in silica network.
5. Fabrication of large core diameter in preform stage is possible to achieve.
6. Uniform longitudinal and radial distribution of dopants in the core of fiber is also achievable.
7. Larger preform length is achievable as compared to prior art.
8. Process repeatability is much higher as compared to other conventional MCVD methods.

We claim:

1. A process for fabrication of ytterbium (Yb) doped optical fiber through vapor phase doping technique, said process comprising the steps of:
  (i) depositing pure silica cladding layers inside a silica glass substrate tube at a main burner temperature in the range of 1900 to 1980° C. using MCVD process;
  (ii) sublimating $AlCl_3$ and $Yb(thd)_3$ in their respective sublimator chambers at a temperature in the range of 100 to 170° C. and 180 to 260° C. respectively to obtain vapors of Al-precursors and Yb-precursors;
  (iii) introducing preheated Helium in the sublimator chambers of step (ii) at a flow rate in the range of 10 to 50 sccm for Al precursors and 100 to 300 sccm for Yb precursors;
  (iv) transporting Al and Yb precursors with Helium obtained in step (iii) to the silica glass substrate tube with the adjustment of temperature of a ribbon burner in the range of 180-370° C., wherein the ribbon burner is fixed before the input end of the silica glass substrate tube;
  (v) passing $O_2$ gas into a $SiCl_4$ bubbler at a temperature in the range of 15 to 40° C. and a flow rate in the range of 80 to 150 sccm to transport $SiCl_4$—$O_2$ gas mixture to the silica glass substrate tube;
  (vi) mixing $SiCl_4$, $O_2$, Al precursors, Yb-precursors, and Helium in the silica glass substrate tube followed by concurrent oxidation to form $SiO_2$, $Al_2O_3$ and $Yb_2O_3$;
  (vii) depositing a sintered core layer comprising $SiO_2$—$Al_2O_3$—$Yb_2O_3$ with targeted $Al_2O_3$ and $Yb_2O_3$ concentrations to obtain a deposited tube;
  (viii) collapsing the deposited tube at a temperature in the range of 1900 to 2300° C. to obtain a fabricated preform; and
  (ix) drawing fibers from the fabricated preform obtained in step (viii) to obtain ytterbium (Yb) doped optical fiber.

2. The process as claimed in claim 1, wherein in step (i) 4-10 pure silica cladding layers are deposited in the silica glass substrate tube.

3. The process as claimed in claim 1, wherein in step (i) the main burner temperature is in the range of 1910-1960° C.

4. The process as claimed in claim 1, wherein in step (ii) the sublimating temperature for $AlCl_3$ is in the range of 120 to 160° C.

5. The process as claimed in claim 1, wherein in step (ii) the sublimating temperature for $Yb(thd)_3$ is in the range of 200 to 240° C.

6. The process as claimed in claim 1, wherein in step (iv) the temperature of the ribbon burner is in the range of 200-350° C.

7. The process as claimed in claim 1, wherein in step (vii) the number of core layers is in the range of 1 to 40.

8. The process as claimed in claim 1, wherein in step (vii) the main burner temperature of deposition of sintered core layer is in the range of 1770 to 1920° C.

9. The process as claimed in claim 8, wherein in step (vii) the main burner temperature of deposition of sintered core layer is in the range of 1820-1880° C.

10. The process as claimed in claim 1, wherein in step (vii) the sintered core layer is deposited with the main burner traverse speed in the range of 9 to 14 cm/min, wherein the main burner traverses along the length of the silica glass substrate tube.

11. The process as claimed in claim 1, wherein in step (ix) the NA (Numerical aperture) of the core glass is in the range of 0.06 to 0.32.

12. The process as claimed in claim 1, wherein in step (ix) the $Al_2O_3$ content of the fiber is in the range of 0.5 to 18 mol %.

13. The process as claimed in claim 1, wherein in step (ix) the $Yb_2O_3$ concentration of the fiber is in the range of 0.2 to 2.0 mol %.

14. The process as claimed in claim 1, wherein in step (ix) the $Yb_2O_3$ concentration of the fiber is in the range of 0.25 to 1.25 mol %.

15. The process as claimed in claim 1, wherein in step (viii) the collapsing temperature is in the range of 2050-2250° C.

16. The process as claimed in claim 1, wherein the length of the fabricated preforms is up to 45 cm.

17. The process as claimed in claim 1, wherein the core diameter of the fabricated fiber is in the range of 10 to 50 μm out of 125 μm overall diameter.

* * * * *